Figures 1, 2, 3, 4:
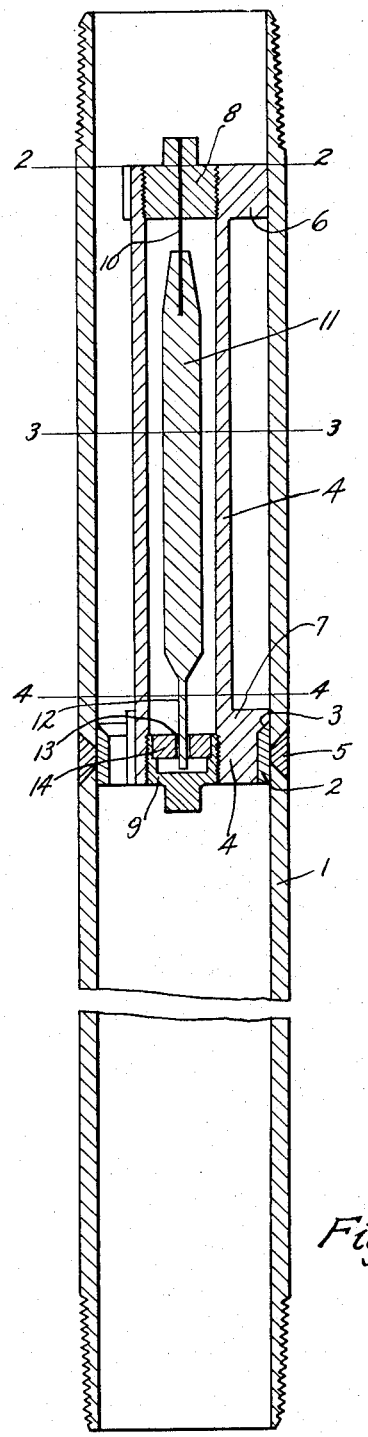

Oct. 31, 1933.   N. H. RICKER   1,932,479

DECLINOMETER FOR DRILL STEMS

Filed Feb. 16, 1931

NORMAN H. RICKER, INVENTOR

BY Jesse R. Stone

ATTORNEY

Patented Oct. 31, 1933

1,932,479

UNITED STATES PATENT OFFICE 1,932,479

DECLINOMETER FOR DRILL STEMS

Norman H. Ricker, Houston, Tex., assignor to Hughes Tool Company, Houston, Tex., a corporation of Texas Application February 16, 1931. Serial No. 516,157

7 Claims. (Cl. 234—5.3)

My invention relates to devices for noting whether a well which is being drilled is deviating from a vertical line. It has application to devices of this character designed for use in rotary drill stems.

It is an object of the invention to provide a device which may be used in a rotary drill stem for indicating deviation from the vertical but which is of simple and strong construction not liable to breakage and not liable to fail in use.

I desire to avoid the use of bottles or easily breakable apparatus or of delicate instruments which easily get out of order.

In the drawing herewith Fig. 1 is a central longitudinal section through a section of drill stem with my invention therein.

Figs. 2, 3 and 4 are transverse sections taken on the planes 2—2, 3—3, and 4—4 respectively of Fig. 1.

I contemplate placing the indicator within a section of pipe to be used in the drill stem at any desired location, preferably adjacent the drill itself so as to be able to note a deviation from the vertical in the well bore as soon as it occurs. The pipe 1 may therefore be a section of the drill stem, threaded at both ends for engagement with couplings or tool joints, not shown.

Between the ends of the pipe section I place an inner ring 2 which has its upper end beveled on the inner side at 3 to form a seat to support the lower end of a pendulum housing 4. The wall of the pipe 1 is perforated at opposite points adjacent the ring 4 to receive a bond of welding material 5 by means of which the ring is tied rigidly in position on the pipe.

The housing 4 is tubular but has its upper and lower ends formed with a plurality of radial arms 6 and 7 respectively, the outer ends of which are shaped to bear closely against the inner wall of the pipe and thus hold the housing accurately aligned axially of the pipe. The lower arms 7 are recessed to engage within the ring 2 and have a tapered shoulder to engage the seat 3. The seat within the ring is a close frictional one tending to retain the housing in position.

Said housing has its ends internally threaded to receive plugs 8 and 9 at the upper and lower ends respectively. The upper plug has an axial opening therein in which is fixed a wire or other flexible support 10 for an elongated pendulum 11. The lower end of the pendulum is formed with a thin spindle 12 to engage within an opening 13 in a deformable disc 14 held in the upper end of the lower plug 9. The opening 13 is only slightly larger than the spindle 12 so as to allow a slight swinging movement of the pendulum when said pendulum is out of its axial position due to a declination of the pipe. The disc 14 may be of any substance easily deformed or worn such as chalk, paraffine, or the like, and the lower spindle 12 may be grooved or fluted longitudinally, as indicated at 15 in Fig. 4, so as to better act on the disc to deform it.

I contemplate suspending the pendulum in any suitable manner so that it may easily swing on its support. It will be seen that, when the drill stem is rotating in the drilling of the well, the pendulum will be unaffected due to its axial position, so long as the drill stem is in an upright vertical position. But when the drill begins to drill a crooked hole and the drill stem deviates from the vertical the pendulum will bear against one side of the disc 14, and as the drill stem rotates, the disc will be gradually worn. The extent of wear and deformation of the disc by the pendulum will indicate the amount of deviation.

When the drill is withdrawn for repairs or replacement of cutters, the disc may be examined and if deviation is indicated steps may be taken to straighten the hole before it has proceeded too far. The disc when worn can be readily replaced ready for a new run of the drill.

I am thus enabled at a slight cost to determine when the well hole is becoming crooked. Prompt measures may then be taken to remedy this defect and loss from this source may be avoided. It will be seen that the housing 4 may be filled with liquid to dampen the movement of the pendulum if found desirable without departing from the invention.

What I claim as new is:

1. A device of the character described including a drill stem, a tubular housing therein axially of said drill stem, a pendulum in said housing, and means in said housing engageable by said pendulum to be worn by said pendulum in the rotation of said drill stem when said pendulum swings from its axial position.

2. A device of the character described including a rotary drill stem, a tubular housing in said stem, a pendulum axially of said housing, a spindle at the lower end of said pendulum and deformable means positioned for engagement with said spindle when said pendulum is moved from its axial position.

3. A housing adapted to be supported in a pipe, a pendulum supported axially of said housing, a spindle on said pendulum, and a disc of deformable material having an opening therein to receive said spindle.

4. A housing adapted to be supported in a pipe, a pendulum supported axially of said housing, a spindle on said pendulum, and a disc of deformable material having an opening therein to receive said spindle, said spindle being fluted to provide a wearing surface thereon.

5. A housing for attachment within a rotary drill pipe, a pendulum supported axially of said housing, a disc of easily deformable material in said housing, and means on said pendulum engaging within an opening in said disc and adapted to wear the same when said pendulum swings from its axial position.

6. A pendulum, means to mount said pendulum axially of a drill stem, a spindle on said pendulum, a disc of easily deformable material having an opening therein to receive said spindle, and adapted to be engaged by said spindle when said drill stem is rotated at an inclination from the vertical.

7. A pendulum, means to mount said pendulum axially of a drill stem, and deformable means adapted to be engaged by said pendulum and worn thereby when said drill stem is rotated at an angle from the vertical.

NORMAN H. RICKER.